April 14, 1931. O. E. FISHBURN 1,800,989
DENTAL CLUTCH AND TRANSMISSION
Filed Nov. 5, 1928 2 Sheets-Sheet 2
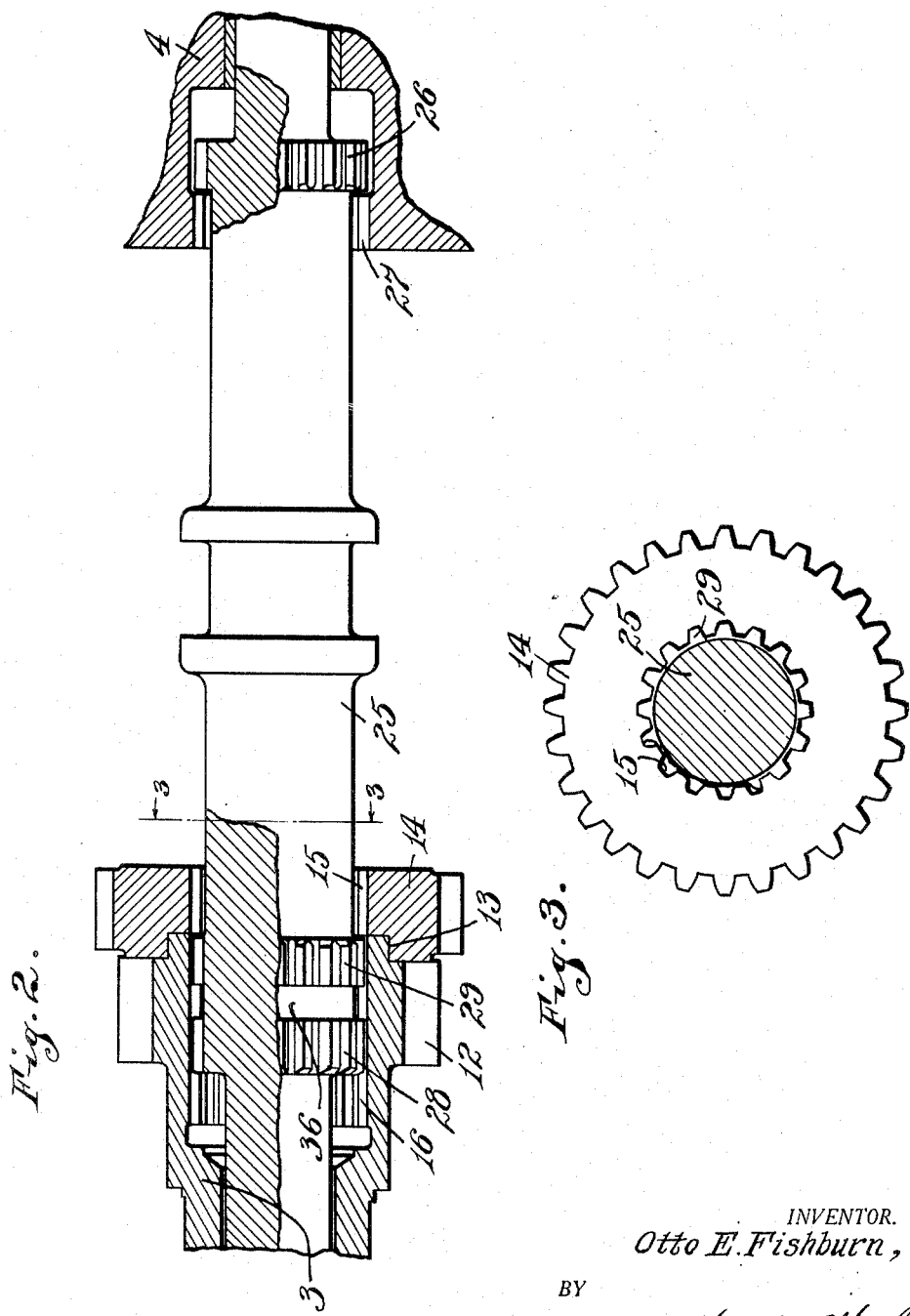
INVENTOR.
Otto E. Fishburn,
BY
Hood + Hahn.
ATTORNEYS Patented Apr. 14, 1931

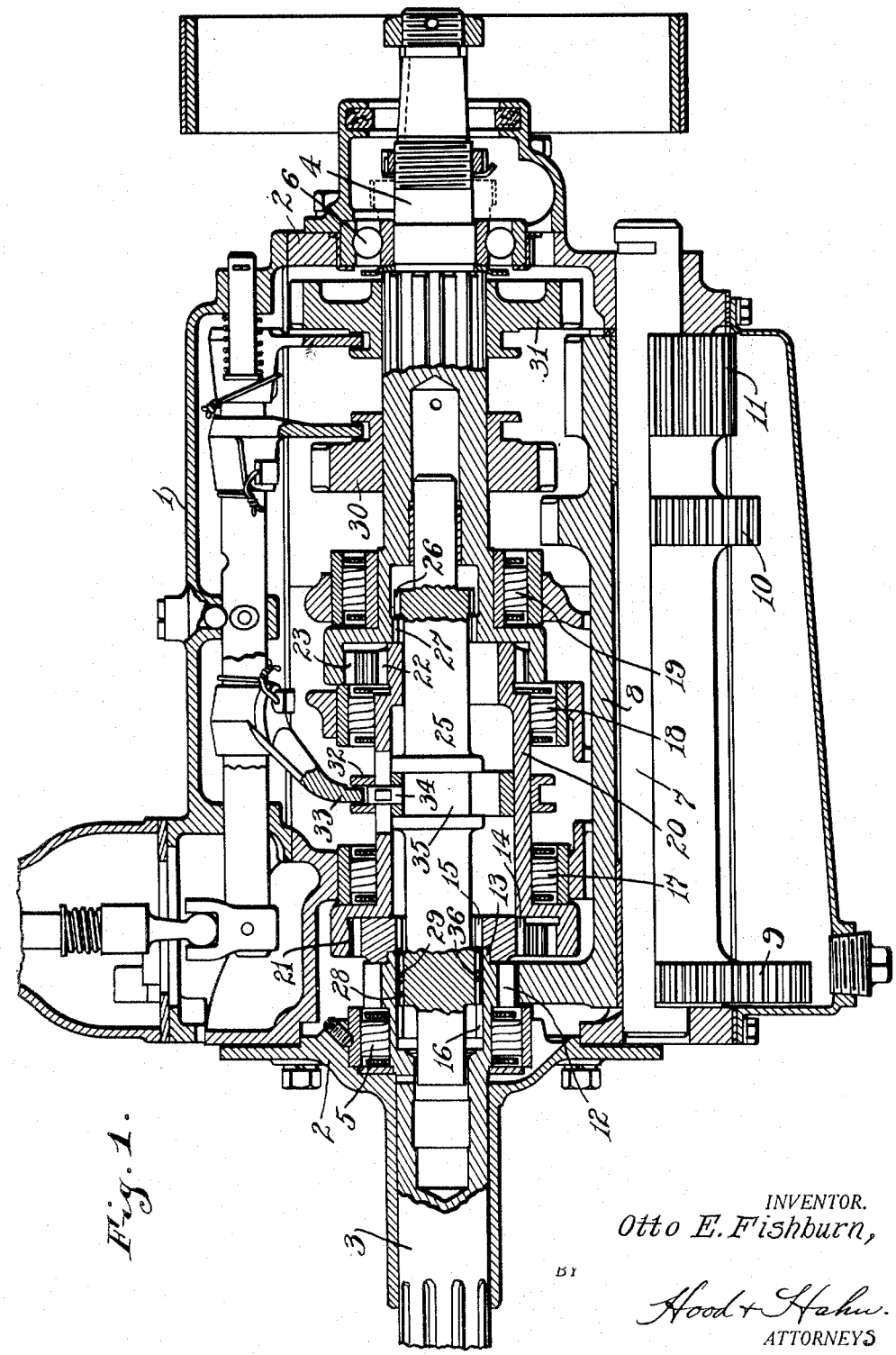

1,800,989

UNITED STATES PATENT OFFICE

OTTO E. FISHBURN, OF MUNCIE, INDIANA

DENTAL CLUTCH AND TRANSMISSION

Application filed November 5, 1928. Serial No. 317,161.

My invention relates to new and useful improvements in transmission gearing and particularly for transmission gearing for automobiles. It has for one of its objects the provision of a transmission gear which is extremely noiseless when driving under lower than high speed and which permits ready shifting of the gears and clutches.

It also has for one of its objects the provision of means for clutching two members together by means of a dental clutch, which clutch will, while permitting axial shifting of the two members for speed change and the like, prevent under normal conditions, an axial creeping between the two members.

For the purpose of disclosing my invention I have illustrated one embodiment thereof in the accompanying drawing in which Fig. 1 is a longitudinal sectional view of a transmission embodying my invention; Fig. 2 a longitudinal section of the dental clutch for connecting certain of the parts together and Fig. 3 a transverse section thereof on the line 3—3 of Fig. 2.

In the embodiment illustrated I provide a transmission casing 1, the two end walls 2 of which are provided with suitable aligned openings for the reception of the power delivery shaft 3 and the power receiving shaft 4, suitable bearings 5 and 6 being provided in these end walls for the respective shafts. Also, mounted in the transmission case and below the delivery and transmission shafts is a jack shaft 7 having thereon a rotatable sleeve 8 provided at its forward end with a transmission gear 9 and at its rear end with a pair of transmission gears 10 and 11.

The power shaft 3 projects into the casing 1 and at its inner end is provided with a driving gear 12 which may be formed integrally with the shaft or may, if desired, be formed separately and fixed on the shaft. In front of this gear the shaft is provided with a smooth shoulder 13 adapted to revolubly support a gear 14 having integral teeth 15, which teeth coincide with internal teeth 16 formed in the hollow end of the shaft 3.

Mounted within the casing in suitable bearings 17, 18 and 19 is a hollow eccentric hub 20 having at one end an internal gear 21 adapted to mesh with the gear 14. The opposite end of this hub 20 is provided with an external eccentric gear 22 adapted to mesh with an internal gear 23 formed on the inner end of the power-receiving shaft 4, these gears 22 and 23 being located between the bearings 18 and 19. The inner end of the power-receiving shaft 4 is hollow and telescopically receives one end of an intermediate shaft 25, the opposite end being adapted to be telescopically received in the hollow end of the power delivery shaft 3. This shaft is slidingly mounted in the two hollow ends of the power delivery and power receiving shafts and at its rear end is provided with teeth 26 adapted to mesh when the shaft is moved in one position with internal teeth 27 in the shaft 4. The opposite end of this shaft is provided with two sets of spaced apart teeth 28 and 29 which are adapted to mesh when the shaft is in one position respectively with the teeth 16 and the teeth 15 and when the shaft is in another position to mesh only with the teeth 16.

The shaft 4 also carries gears 30 and 31 which are splined thereon so as to rotate therewith while being axially movable on the shaft.

The hollow hub 20 is provided with a collar 32 having an annular groove therein adapted to receive the end of a shifting fork 33. This collar rotates with the hub 20 and is axially movable thereon, being provided with a series of teeth or pins 34 adapted to engage in an annular groove 35 in the intermediate shaft 25 to permit of the shifting thereof axially.

In operation the gear 12 is in constant mesh with the gear 9, thereby driving the sleeve 8 constantly. When it is desired to drive the shaft 4 at low speed the gear 31 is shifted forwardly on the shaft 4 until it meshes with the teeth of the gear 11 and power will be transmitted from the power shaft through the jack shaft and the gears 11 and 31 to the power-receiving shaft. In order to shift to the next higher speed the gear 31 is shifted out of engagement with the gear 11 and the gear 30 shifted forwardly until it meshes with the gear 10 in which event the power from the jack shaft will be transmitted to the power receiving shaft at a slightly higher speed.

To drive the power receiving shaft at a still higher speed the intermediate shaft 25 is shifted rearwardly until the teeth 28 are in mesh with the teeth 16 and the teeth 29 are in mesh with the teeth 15 whereby the gear 14 is locked by the shaft 25 to the power delivery shaft 3. With the gear 14 locked in this position, power will be transmitted from this gear through the internal eccentric gear 21 on the hub 20, thereby rotated by the hub and in turn driving the power receiving shaft 4 through the external eccentric gear 22 and the internal gear 23. This drive is an extremely silent drive due to the construction of the gears and the power-receiving shaft is driven at next to its highest speed thereby.

For driving the power receiving shaft at its highest speed the power receiving shaft is directly connected to the power transmission shaft through the intermediate shaft 25 by shifting this shaft forwardly until the teeth 29 are out of mesh with the teeth 15 and the teeth 28 and 29 are both in mesh with the teeth 16. This forward shifting of the intermediate shaft 25 also moves the teeth 26 into engagement with the teeth 27 on the power-receiving shaft, whereby the power delivery shaft and power receiving shaft are directly connected and the power receiving shaft is driven at the same speed as the power delivery shaft.

In actual construction it will of course, be understood that a suitable reversing gear is provided, although the same is not disclosed in the present application, as this is of the usual construction. The details of the arrangement and construction of the shifting forks are also not described as these are of ordinary construction and may be modified at discretion.

In operation it has been discovered that in driving at third speed there has been a tendency on the part of the intermediate shaft 25 to creep forward, thereby disengaging teeth 29 from the teeth 15. In order to prevent this axial creeping of the intermediate shaft under these conditions, I have provided means which, while permitting the forward shifting of the shaft to its full limit when under no load, will prevent the forward creeping of this shaft under load when the teeth 29 are in mesh with teeth 15. To accomplish this result the teeth 28 and 29 are separated by a blank or groove 36 and the pitch line thickness of the teeth 28 is slightly less than that of the teeth 29. In actual practice this difference in thickness is very slight, eight thousandths of an inch being ample. As a result the teeth 28 are slightly smaller than the internal teeth 16 and when these teeth are in mesh with the teeth 16 and the teeth 29 in mesh with the teeth 15 with the parts under load in either direction, the teeth 29 are slightly out of radial alignment with respect to the teeth 16 and therefore cannot pass into engagement therewith. This slight difference in the size of the teeth, however, is not sufficient to prevent the teeth 29 sliding into engagement with the teeth 16 when the parts are not under load and therefore does not prevent the ready axial shifting of the shaft 25 when necessary.

I claim as my invention:

1. The combination with a driving member and a driven member each having radial teeth, of a clutch member for connecting said members having radial teeth adapted to telescope the teeth of the driving and driven members and arranged in two parallel spaced apart rows the pitch line thickness of one of said rows being smaller than that of the other row.

2. The combination with a driving member and a driven member each having radial teeth of a clutch member for connecting said members having radial teeth adapted to telescope the teeth of the driving and driven members and arranged in two axially spaced apart rows, the pitch-line thickness of one row being less than the thickness of the other row.

3. The combination with a driving member and a driven member each having a set of internal teeth, of a clutch member having external teeth adapted to telescopically engage said internal teeth, said external teeth comprising two rows axially aligned and the teeth of the forward row being of less thickness than those of the back row.

4. The combination with a shaft and a gear each having a set of internal teeth, of an axially movable clutch member for connecting said shaft and gear having a set of external teeth telescopically engaging the teeth of the shaft and a second set of external teeth adapted to telescopically engage the teeth of the gear, the pitch-line thickness of one of said sets of teeth on the clutch member being less than that of the second set.

5. The combination with a shaft and a gear each having a set of internal teeth, of an axially movable clutch member for connecting said shaft and gear having two sets of axially spaced apart teeth adapted to telescopically engage the teeth of said shaft, one of said sets having a greater pitch-line thickness than the other set and adapted to engage the teeth of said gear.

In witness whereof, I have hereunto set my hand at Muncie, Indiana, this 26th day of October, A. D. one thousand nine hundred and twenty-eight.

OTTO E. FISHBURN.